United States Patent [19]

McKenzie

[11] Patent Number: 4,579,305

[45] Date of Patent: Apr. 1, 1986

[54] CABLE SUPPORT APPARATUS

[75] Inventor: Robert W. McKenzie, Lewisville, Tex.

[73] Assignee: Rockwell International Corporation, El Segundo, Calif.

[21] Appl. No.: 653,635

[22] Filed: Sep. 24, 1984

[51] Int. Cl.⁴ .............................................. F16L 3/22
[52] U.S. Cl. .................................... 248/68.1; 248/73; 248/222.4
[58] Field of Search ............... 248/68.1, 71, 73, 222.4, 248/223.1, 220.2, 231.9, 227, 297.3, 220.3; 24/297; 211/87; 411/508, 510, 173

[56] References Cited

U.S. PATENT DOCUMENTS

| 3,180,606 | 4/1965 | Sabin et al. | 248/73 |
| 3,282,519 | 11/1966 | Rheinstrom | 248/222.4 |
| 3,334,851 | 8/1967 | Cassidy et al. | 248/68.1 |
| 3,576,305 | 4/1971 | Welsh et al. | 248/68.1 |
| 3,731,956 | 5/1973 | Hanley | 248/223.1 |
| 3,923,277 | 12/1975 | Perrault et al. | 248/68.1 |
| 4,106,630 | 8/1978 | Rosenband | 248/223.1 |
| 4,455,692 | 6/1984 | Hegge et al. | 248/297.3 |

FOREIGN PATENT DOCUMENTS 0753129  2/1967  Canada .............................. 248/222.4

Primary Examiner—Ramon S. Britts
Assistant Examiner—Ramon O. Ramirez
Attorney, Agent, or Firm—Bruce C. Lutz; V. L. Sewell; H. Fredrick Hamann

[57] ABSTRACT

A slightly flexible and generally C-shaped cable support apparatus for quick attachment and detachment from a sheet material support structure to which a plurality of cables can be tied using cable ties and which locks in place after the cable support apparatus is temporarily deformed and moved laterally into position. Removal is accomplished by temporarily deforming the support apparatus and removing in the opposite direction from the insertion. The holding means used in the insertion process are devised to accept different thicknesses of sheet material support structure. An edge of the C-shaped portion of the cable support apparatus is designed to reduce cable insulation damage on sharp edges of the sheet material by extending over and covering same.

5 Claims, 5 Drawing Figures

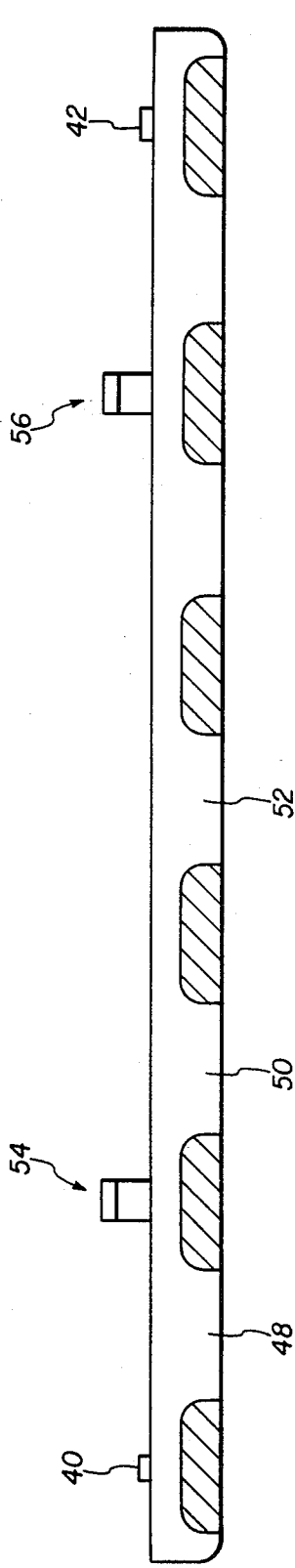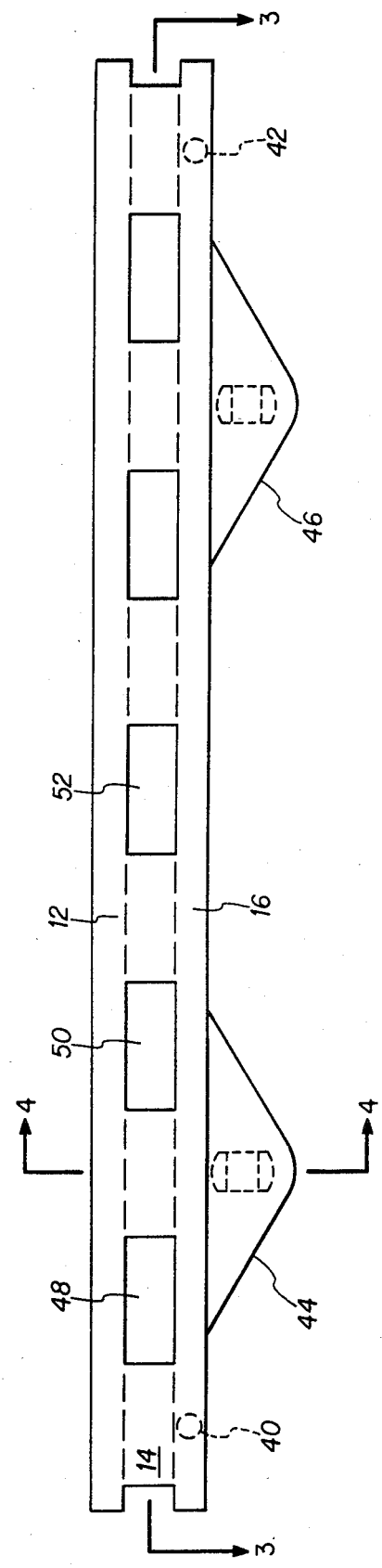

CABLE SUPPORT APPARATUS

THE INVENTION

The present invention is generally concerned with electrical wire or cable assemblies and more specifically concerned with supporting electrical cable assemblies. Even more specifically, the invention is concerned with providing a device for easily and conveniently removing a plurality of cables as a unit from a structural member for replacement or repair.

BACKGROUND

While the prior art has had cable support apparatus containing openings therein for insertion of cable ties whereby a plurality of cables could be attached as a composite cable assembly, the design was such that they were difficult to disassemble from the structural support member and in many instances the design made it inconvenient to initially attach cables to the cable support apparatus or inconvenient after assembly to work on individual cables or wires within the assembly. Further, the prior art cable support devices known to the present inventor did not include mechanical protection for the wires from sharp edges of openings in nearby structural members through which the wires in the cable assembly might have to pass.

The present inventive concept comprises a springy material or deformable device containing a plurality of cable tie openings which has T-shaped holding means for insertion in keyhole shaped slots in a sheet material structural support and which device is temporarily deformable for attaching to the support structure and moving laterally into the keyhole until a locking tab engages a further opening in the support structure to lock the cable support apparatus into place. The cable support is attached to the structural member near an elongated opening or edge thereof whereby the support has a smoothly rounded extension which covers the cross-sectional area of the opening to provide mechanical protection between the sharp edges of the sheet material support structure and any wires passing adjacent thereto.

It is therefore an object of the present inventive concept to provide an improved cable support apparatus.

Other objects and advantages of the present invention will be apparent from a reading of the specification and appended claims in conjunction with the drawings wherein:

FIG. 2 is a front or plan view of a more generically usable version of the cable support of FIG. 1;

FIG. 3 is a top view of the cable support of FIG. 2;

DETAILED DESCRIPTION

Figure 1:
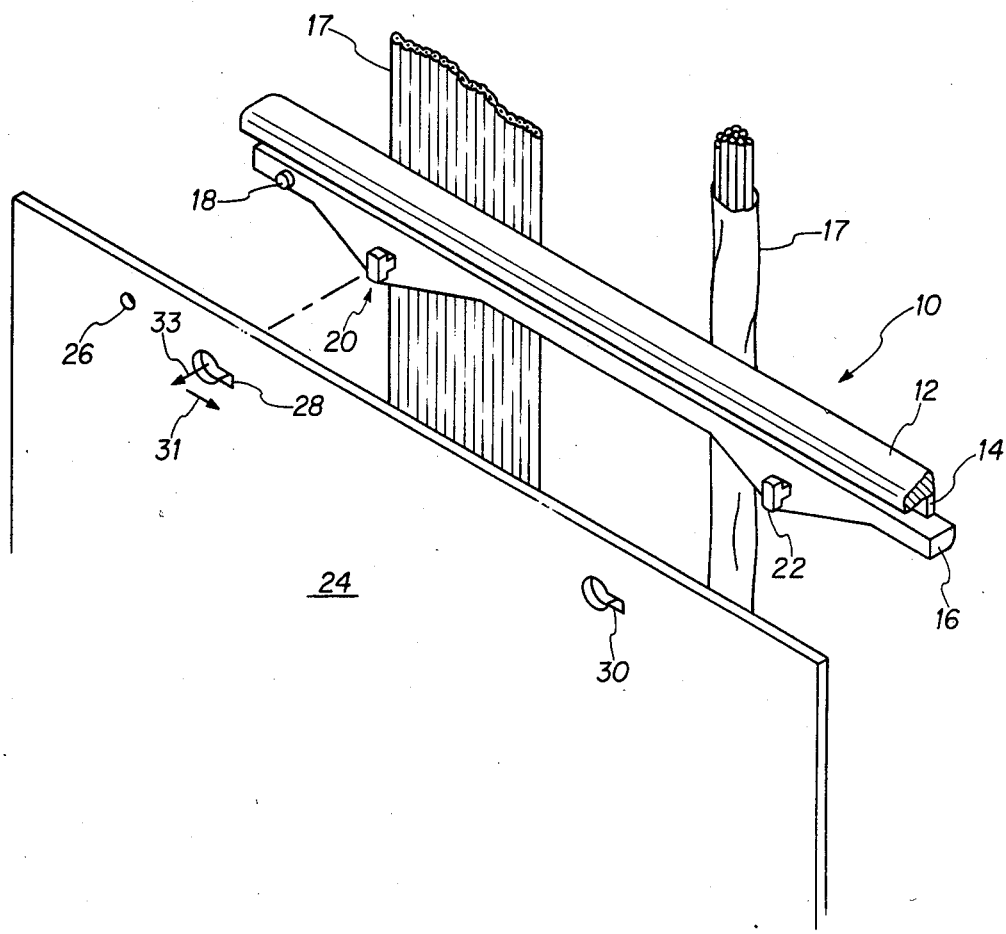
FIG. 1 is a pictorial view of a cable support apparatus of the invention and a sheet material structural member to which the cable support can be attached.

In FIG. 1 a cable support apparatus generally designated as 10 has an upper rounded surface or lip 12, a back portion 14 and a lower portion 16. The three portions 12, 14 and 16 form a generally C-shaped cross-sectional appearance with the top portion extending farther from the side portion than does the bottom portion. Cable assemblies 17 are shown attached to support apparatus 10. The assemblies 17 may be ribbon cable or bundles of individual wires. A generally downward extension from lower portion 16 includes a nib, projection or locking tab 18 as well as generally T-shaped attachment means 20 and 22. The T-shaped attachment means 20 and 22 include a holding cross-piece and a shank with the shank extending from the cross-piece to the downward extension of the support 10. The support structure is generally indicated as 24 and contains openings 26, 28 and 30. Openings 28 and 30 are keyhole shaped. The cable support 10 is placed next to structural support 24 in such a way that the attachment means 20 and 22 are inserted in holes 28 and 30 along the direction of arrow 33. The device 10 is then deformed so that the T-shaped attachment means can extend far enough through the openings 28 and 30 to allow the support 10 to be moved along the direction of arrow 31 to the right whereby the shanks of the T-shaped attachment means 20 and 22 go to the small end of the keyhole openings 28 and 30. At the rightmost position, the locking tab 18 engages opening 26 and the cable support is locked in place with respect to the structural support 24.

In FIG. 2 the front or plan view of a cable support of the same general type as shown in FIG. 1 shows the cable support from the back surface 14 such that the top and bottom portions 12 and 16 extend into the paper. Thus, the T-shaped projections 20 and 22 of FIG. 1 cannot be seen. However, locking projections are shown in dotted line form. Since the embodiment of FIG. 2 has two locking tabs, the locking tabs have been redesignated as 40 and 42. The reason for two locking tabs is for symmetry so that the part can be used on either side of an opening or edge of a piece of sheet material depending on where the cable assembly is to be located. The T-shaped attachment means are located on the opposite side of the downward ears, projections or tabs 44 and 46. There are a plurality of openings in the backside 14. Three of the openings have been designated 48, 50 and 52 for discussion purposes.

In FIG. 3 the parts have been given the same designations as shown in FIG. 2 and in addition, the T-shaped attachment means, 20 and 22 of FIG. 1, have been given designators 54 and 56.

Figure 4:
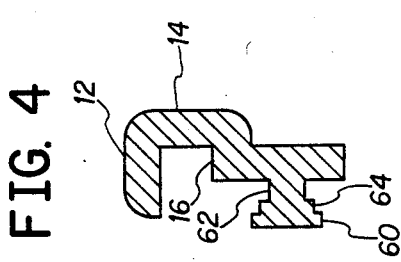
FIG. 4 is an end view of the cable support of FIG. 2.

In looking at FIG. 4, which is an end view of the support apparatus 10 with a cross-section through one of the T-shaped attachment means 54, it will be noted that the attachment means comprises a cross-piece 60 and a shank 62. However, the shank 62 is two different widths or, in other words, it is stepped as opposed to the single thickness shown in FIG. 1. The second thickness or shank portion designated as 64 serves as a holding cross-piece for sheet material of one thickness while the cross-piece 60 serves as the holding cross-piece for thicker sheet material and the thickness 64 is the portion pressing against the sides of the keyhold opening in the sheet material.

Figure 5:
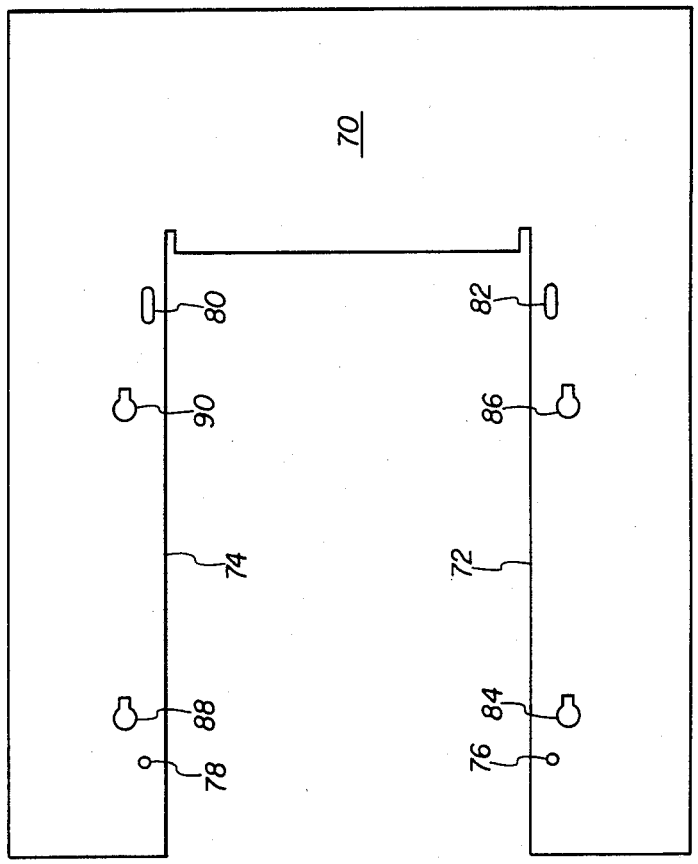
FIG. 5 is a front or plan view of the sheet structural support having openings for utilizing two cable support means of the present invention.

In FIG. 5 the structural support member is designated as 70 and has sharp edged surfaces 72 and 74. Adjacent to these sharp edged surfaces or cross-sections of the structural support 70 are a plurality of openings designated as 76 and 78 for circular openings used to interact with the locking tab projections such as 18 of FIG. 1, elongated openings 80 and 82 for allowing the non-locking tab on the symmetrical cable support illustrated in FIGS. 2 and 3 to move laterally during insertion or removal and the keyhole shaped openings 84, 86, 88 and 90.

OPERATION

The usage of the present invention is reasonably straightforward. In the version illustrated in FIG. 1, which is not symmetrical and therefore can only be used on one side of a piece of sheet material 24, the cross-pieces of the T-shaped attachment means 20 and 22 are inserted through the large portion of the keyholes 28 and 30. At this point, the locking tab 18 will not be aligned with the opening 26. Further, the tab 18 will prevent the cross-piece portion of the T-shaped attachment means 20 from extending to the inner surface of structural support 24. However, since the cable support 10 is made of a slightly flexible material, inward pressure can be placed on the backside 14 to cause a deflection of cable support 10 whereby the T-shaped attachment means 20 will extend far enough through opening 28 that the entire unit 10 can be moved in the direction of arrow 31. When the cable support 10 is moved to the most righthand portion of the keyhole slots 28 and 30, the locking tab 18 will be aligned with opening 26. At this point pressure can be released from the side 14 of cable support 10 and the device will lock in place. Cable ties of wire or plastic or other suitable material may then be used to attach wires such as shown designated as 17 through the openings such as 48 and 50 in FIG. 2 to the cable support 10.

To remove the cable assembly including the cable support 10 from the structural support 24, a prying means can be inserted between the structural support 24 and the lower portion 16 of cable support 10 to disengage the locking tab 18 from the opening 26. At this point, the cable support 10 can be slid in the direction opposite that shown of arrow 31 until the T-shaped attachment means are aligned with the large portion of the keyhole slots 28 and 30 and the cable support 10 can then be moved in a direction opposite the direction arrow 33 to detach the entire cable assembly from the structural support 24.

As mentioned previously, FIG. 4 illustrates a T-shaped attachment means for use on two different thicknesses of sheet structural support material. In the case of a thinner structural support material, the portion 64 is used as the cross-piece holding means and the size of the small portion of the keyhole slots would be equal to the minimal shank thickness as shown in FIG. 4. However, for thicker sheet material, the portion 60 would be the holding cross-piece member and the minimal size of the keyhole slot into which the cable support is inserted would be the size of the thicker shank portion 64.

As also mentioned previously, the inventive concept may be made symmetrically such as shown in FIGS. 2 and 5 so that the cable support can be used on opposite sides of the same sheet material or as illustrated in FIG. 5 on the top and bottom of an opening in the structural support material. Thus, cables can be brought down from the top and bent around surface 74 of FIG. 5 and the top portion 12 in extending over the sharp edges of the sheet material 70 will prevent any scraping or damage to the wire insulation. A similar cable support can be placed to cover surface 72 of FIG. 5 and allow wires to be brought from the lower portion of the structural support 70 into the opening shown and again the cable support will prevent damage to the wires from the sharp edges of the sheet material at surface 72.

In summary, the present invention comprises a cable support having T-shaped attachment means and openings for cable ties whereby the cable support can easily be detached from a supporting structure. This easy detachment will typically be accomplished by making the cable support of slightly flexible material and also typically will use a locking means similar to that of 18 to prevent accidental movement of the cable support with respect to the structural support. Included within the inventive concept is also the idea of having a stepped shank or variable diameter shank on the T-shaped attachment means to allow usage of the cable support in a secure manner on structural sheet material support means of various thicknesses.

However, the invention is not limited to the embodiments illustrated but only by the scope of the appended claims wherein I claim:

1. Electrical cable support apparatus for attachment to a sheet material structural member comprising, in combination:
   an elongated support means having bottom, side and top portions, wherein,
      the bottom, side and top portions in cross-section have a generally C-shaped appearance,
      the side portions include a series of openings through which cable ties can be run for attaching and positioning electrical cable assemblies, and
      the top portion has rounded exterior surfaces and extends further from the side portion than does the bottom portion whereby sharp edges on the sheet material structural member are mechanically insulated from electrical cable assemblies;
      further means extending downwardly from said bottom portion; and
   T-shaped attachment means, including shank and cross-piece means, said T-shaped attachment means extending outwardly from said further means for slideably engaging keyhole shaped openings in the sheet material structural member.

2. Apparatus as claimed in claim 1 wherein the shank of said T-shaped member has first and second thicknesses and the second thickness acts as a cross-piece for the first thickness when said support apparatus is attached to relatively thin sheet material structural members.

3. Cable support apparatus for quickly attaching a plurality of electrical cables to sheet material support apparatus having shaped attachment openings therein whereby the resulting assembly of cables can be quickly detached from the support apparatus and relocated as a unit comprising, in combination:
   generally C-shaped frame means with top, bottom and side portions, the side portions having a plurality of openings therein and the top portion comprising an extended upper lip which extends farther from the side portion than does the bottom portion whereby the extended lip is for contacting a cross-sectional portion of said sheet material support apparatus and providing vertical support to said cable support apparatus; and
   T-shaped attachment means, extending from said frame means and forming a further part of said cable support apparatus, for insertion into the shaped attachment openings of the sheet material support apparatus.

4. Apparatus as claimed in claim 3 wherein said T-shaped attachment has a holding cross-piece and a stepped thickness shank whereby the thicker part of the shank is used as a holding cross-piece for thin sheet material support apparatus and the primary holding cross-piece is used for holding when the cable support is used with thicker sheet material.

5. Apparatus as claimed in claim 3 wherein the cable support apparatus has a spring like flexibility and comprising, in addition:

locking protrusion means for interaction with an opening in the sheet material support apparatus to prevent movement of said cable support apparatus with respect to said sheet material support apparatus until said cable support apparatus is flexed enough to disengage said locking protrusion means from the opening in the sheet material support apparatus.

* * * * *